United States Patent [19]

Ogihara et al.

[11] Patent Number: 4,696,560
[45] Date of Patent: Sep. 29, 1987

[54] CAMERA SHUTTER

[75] Inventors: Masuo Ogihara; Hajime Oda; Yoichi Seki; Hiroshi Yamazaki, all of Yotsukaido, Japan

[73] Assignee: Seikosha Co., Ltd., Tokyo, Japan

[21] Appl. No.: 730,743

[22] Filed: May 6, 1985

[30] Foreign Application Priority Data

May 9, 1984 [JP] Japan .................................. 59-92183

[51] Int. Cl.$^4$ .............................................. G03B 7/08
[52] U.S. Cl. .................................... 354/439; 354/452
[58] Field of Search ............... 354/435, 437, 439, 446, 354/451, 452, 455, 271.1

[56]  References Cited

U.S. PATENT DOCUMENTS

| 4,009,866 | 3/1977 | Iwata et al. | 354/439 |
| 4,053,907 | 10/1977 | Iwata et al. | 354/437 |
| 4,354,748 | 10/1982 | Grimes et al. | 354/437 |
| 4,396,271 | 8/1983 | Hiraike | 354/271.1 |
| 4,396,272 | 8/1983 | Shono et al. | 354/455 |

Primary Examiner—Russell E. Adams
Attorney, Agent, or Firm—Bruce L. Adams; Van C. Wilks

[57] ABSTRACT

In a program shutter having a sector which is opened and closed by a step motor, there is provided a home position detection means for detecting whether or not the sector is positioned in a home position. Before and after an exposure operation, it is detected whether or not the sector is positioned in the home position, and if the sector is not positioned in the home position, the step motor is reversely rotated to complete the closing movement of the sector.

14 Claims, 12 Drawing Figures

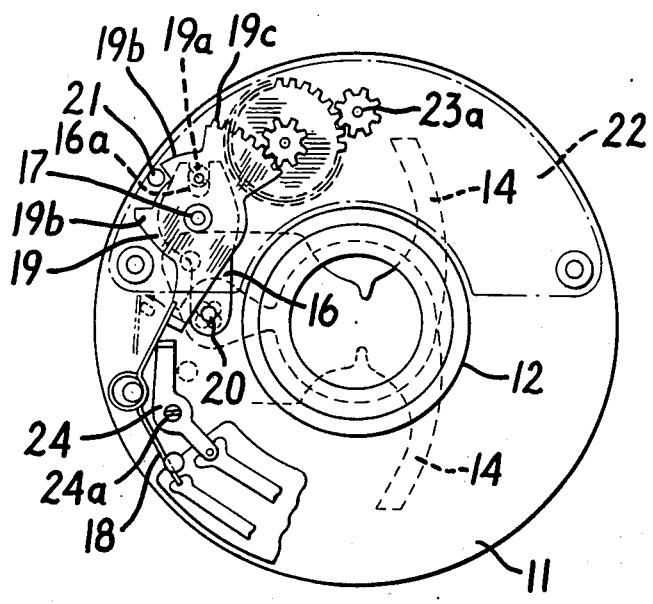
FIG. 2a
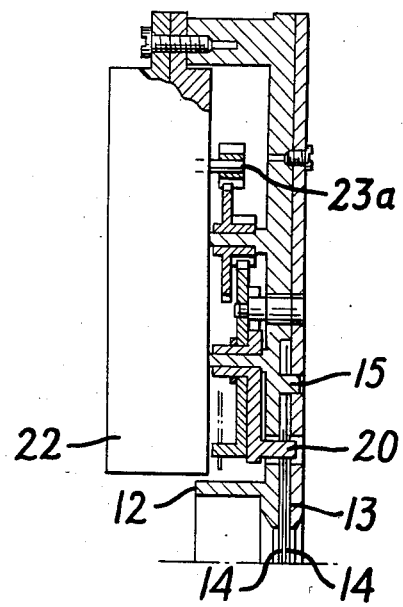
FIG. 2b
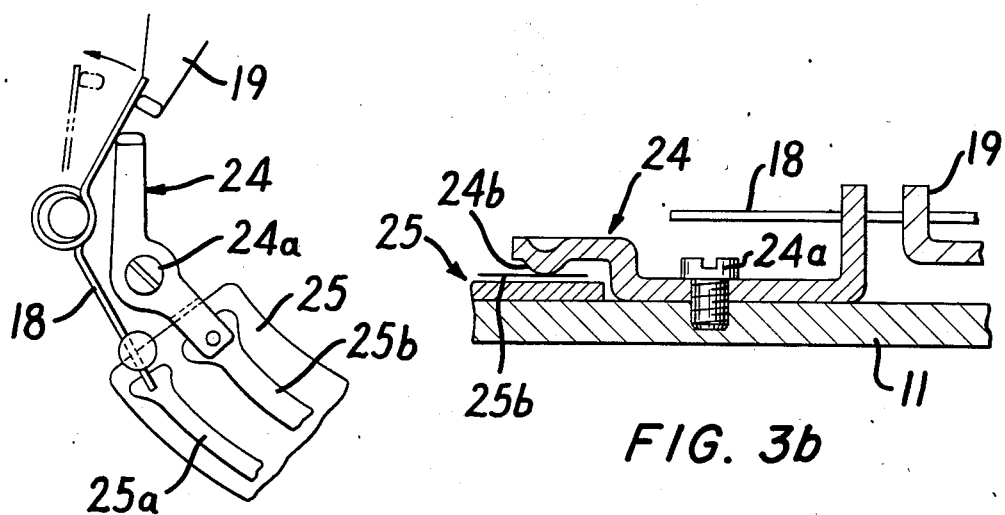
FIG. 3a
FIG. 3b

CAMERA SHUTTER

BACKGROUND OF THE INVENTION

This invention relates to a camera shutter for enabling a shutter blade to be opened and closed by a step motor.

The camera shutter for enabling a shutter blade to be opened and closed by the step motor is constituted in such that drive pulses having a fixed frequency is input to the step motor by a release operation to forwardly rotate the step motor and to gradually open sectors, and a phase of the drive pulse is switched at a timing when the step motor is rotated by such steps corresponding to an exposure quantity to reversely rotate the step motor and to close the sectors, thus obtaining a predetermined exposure.

However, in such a shutter enabling sectors to be opened and closed by the step motor as above mentioned, synchronization between a rotational phase of a rotor and a drive pulse tends to fail because of fluctuation in load torque of a shutter mechanism itself, and there occurs a dislocation in rotaton of the rotor to disadvantageously cause the shutter to remain open.

SUMMARY OF THE INVENTION

Accordingly, it is an object of the present invention to provide a camera shutter which can prevent the shutter from remaining open by forcibly returning a sector to a home position before and after an exposure operation.

BRIEF DESCRIPTION OF THE DRAWINGS

FIGS. 2a and 2b are a plan view and a sectional view of the preferred embodiment of the shutter mechanism employed in the present invention, respectively;

FIGS. 3a and 3b are a plan view and a sectional view of the preferred embodiment of the home position detector in the device according to the present invention, respectively;

DETAILED DESCRIPTION OF THE INVENTION

Figure 1:
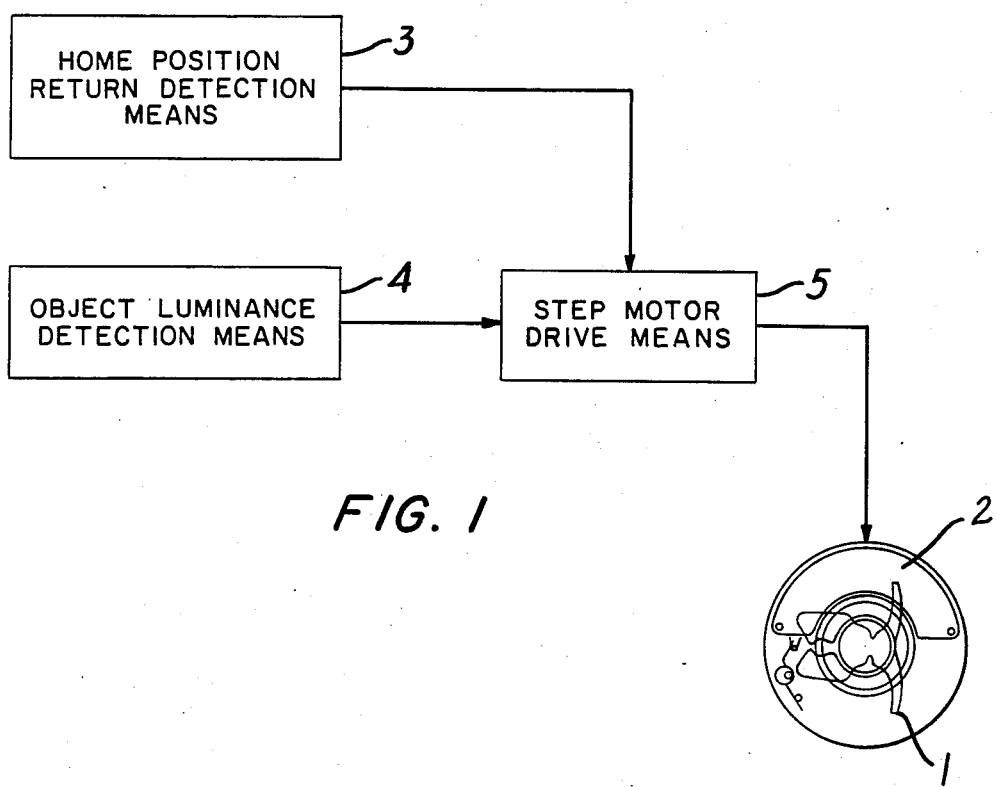
FIG. 1 is a block diagram of the device according to the present invention.

As shown in FIG. 1, the present invention comprises a shutter mechanism body for enabling a sector 1 forming a lens aperture to be opened and closed by a forwardly/reversely rotatable step motor 2 to define an exposure interval, and a control unit comprising home position return detection means or position detection means 3 for detecting that the sector 1 is positioned at a home or rest position, and motor driver means or stepping motor driving means 5 for driving the step motor 2 with a rotational quantity corresponding to an object luminance or brightness detected by an object luminance detection means or brightness measuring means 4 and reversely rotating the step motor 2 when it is detected that the sector 1 is not positioned at the home position by the home position return detection means before and after an exposure operation or interval.

A preferred embodiment of the present invention will be described below in detail in conjunction with the drawings.

FIG. 2 shows an exemplary shutter mechanism adapted to the present invention, in which a reference numeral 11 designates a base plate mounting a guide plate 12 thereon for positioning a lens. There is defined a sector chamber 13 between the base plate 11 and the guide plate 12. Two shutter sectors 14 symmetrically rotating to define a lens aperture are rotatably mounted by a pin 15 in the sector chamber 13. A sector drive lever 16 is rotatably supported by a shaft 17 fitted to the base plate 11, and is engaged through a recessed portion 16a formed at one end thereof with a pin 19a of a sector driving wheel 19 rotatably mounted around the shaft 17, while the sector drive lever 16 is also engaged with sectors 14 by a sector pin 20 fitted to the base plate side. The sector driving wheel 19 as above mentioned is rotataby supported by the shaft 17 so as to be restricted in a reference position at rest by stopper portions 19b formed on an outer circumference of the wheel 19 and by a position restricting spring 18 applying levo-rotation to the wheel 19, and is connected by a teeth portion 19c formed at one end thereof through a circle or gear train to a drive shaft 23a of a step motor 22. Reference numeral 24 designates a home position return detection member which constitutes a characterized part of the present invention. As shown in FIG. 3, the home position return detection member 24 is constituted in such that a conductive plate-like member is upwardly bent at one end thereof to form a conductive piece, and that it is mounted to the base plate 11 by a screw 24a so as to opposedly come into contact with the position restricting spring 18 when the sectors 14 are returned to the home or rest position, and that it is provided at the other end thereof with a contact point 24b to come into contact with a lead wire 25a of a terminal plate 25 so as to form a conductive line or loop together with the position restricting spring 18 when the sectors 14 are positioned to the home position. The terminal plate 25 includes two conductive patterns 25a and 25b with enlarged portions at each one end thereof formed on an insulating substrate by a printing technique, and the terminal plate 25 is fixed to the base plate 11 under the condition where one lead wire 25a is electrically connected to the position restricting spring 18, while the other lead wire 25b is electrically connected to the contact point 24b of the conductive piece. Reference numeral 21 designates a pin for engaging with the stopper portion 19a of the sector driving wheel 19 to restrict a rotational range.

Figure 4A:
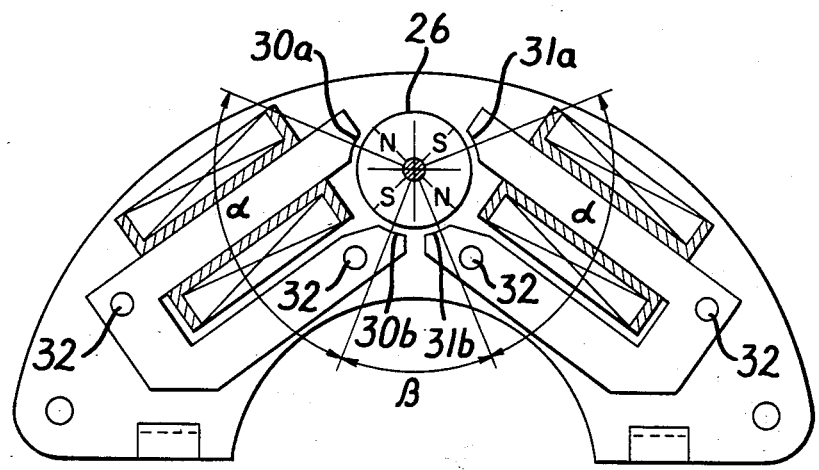
FIGS. 4a and 4b are a plan view and a sectional view of the preferred embodiment of the step motor employed in the device according to the present invention, respectively.
Figure 4B:
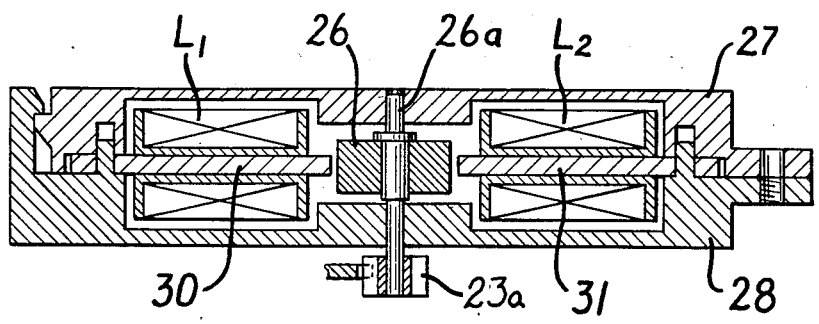

FIG. 4 shows a preferred embodiment of the step or bidirectional stepping motor 22 as above mentoned, in which reference numeral 26 designates a quadripole rotor composed of a permanent magnet. The quadripole rotor 26 is constituted in such that one end of a rotor shaft 26a is projected so as to be rotatably mounted to an upper plate 28 and a lower plate 27 and the sector driving wheel 19 of the shutter mechanism is driven by a pinion 23a mounted to the shaft 26a. Reference numerals 30 and 31 are stators formed of U-shaped magnetic materials having respective two leg portions. Each one of the respective leg portions is surrounded by exciting coils $L_1$ and $L_2$, and there are formed magnetic pole portions 30a, 30b, 31a and 31b at respective free ends of each stator in a position at an angle of 90° relative to the rotor 26. The stators 30 and 31 are arranged in an inverted V-shape and are positioned by guide pins 32 so that the magnetic pole portions 30b and 31b are positioned at an angle of 45° relative to the rotor 26. The rotor 26 is permitted to be rotated in forward and reverse directions with one step set at 90°.

Figure 5:
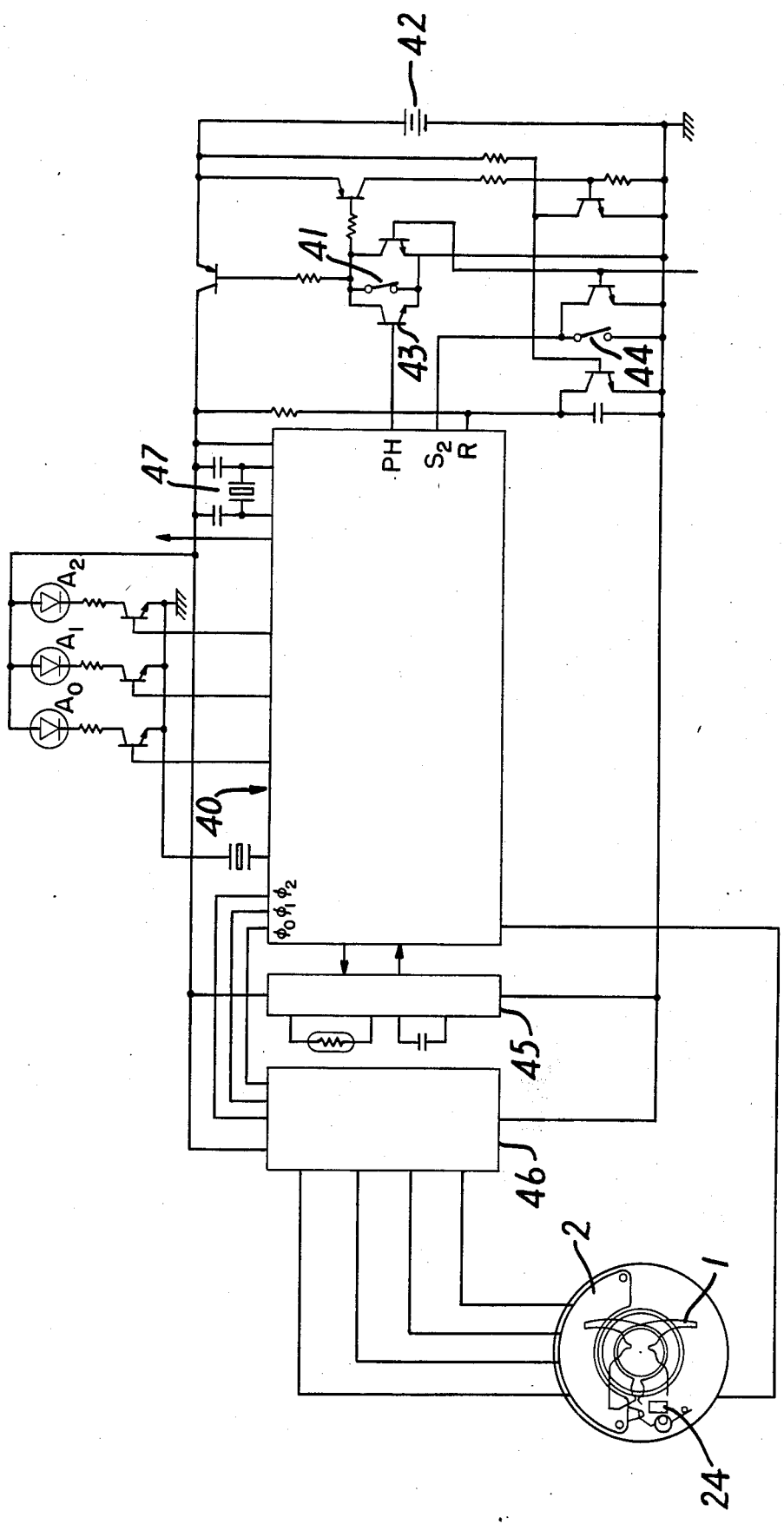
FIG. 5 is a schematic view of the device of the preferred embodiment according to the present invention.

FIG. 5 shows a preferred embodiment of a signal processing device constituting an essential part of the present invention, in which reference numeral 40 designates a microcomputer forming a central portion of the signal processing device. The microcomputer 40 is supplied with an operating voltage $V_{DD}$ from a power supply 42 by the operation of a power switch 41 interlocked with a release button (not shown), and such a power as to be supplied is held by a transistor 43, thus starting a series of operations according to a program. At the timing when a predetermined time is elapsed after turning on of a release switch 44, the supply of the operating voltage is cutoff to stop the operation of the microcomputer. The microcomputer 40 is connected at input ports to a luminance detection circuit or brightness measuring means 45 for outputting a signal suitable for an appex operation with an N times width for a $\sqrt{2}$ times object luminance or brightness, and to a home position return detector or position detecting means 24 for detecting whether or not the sectors are positioned in a home position. Further, the microcomputer 40 is connected at output ports $\phi_0-\phi_2$ to a step motor 2 for driving the sector 1 through a step motor deiver 46. Reference numerals $A_0-A_2$ designate indicating lamps for generating various alarms, and 47 designates a crystal resonator for generating a reference timing signal of the processing device.

Figure 6:
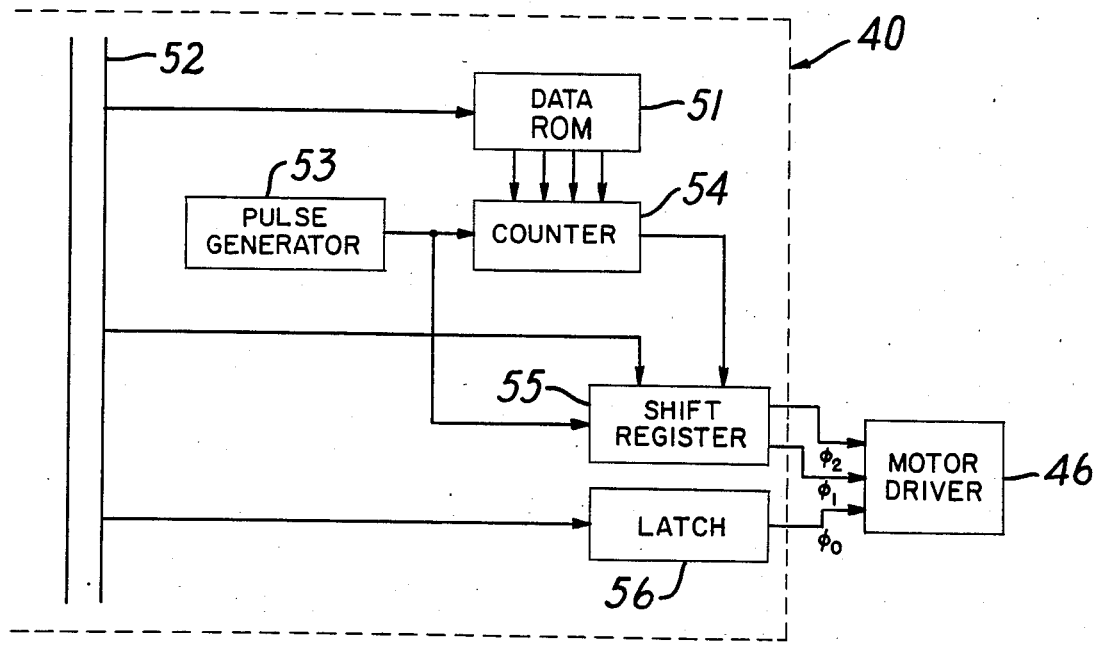
FIG. 6 is a block diagram of the motor drive circuit in the device in FIG. 5.

FIG. 6 is a block diagram showing a preferred embodiment of a forming part of a motor drive signal or stepping motor drive means, in which reference numeral 51 designates a data ROM accessed by a data input through a data bus 52. In other words, an exposure quantity E is stored in an address with a step rotational number $N_s$ of the step motor defined as a data, and an exposure quantity $E_x$ determined by an EE operation to provide a rotational quantity data of the step motor. A counter 54 operates to preset a step rotatonal number $N_s$ before opening of the sector; and is counted down by a pulse from a pulse generator 53. When a count content reaches zero, the step rotational number is preset again. A shift register 55 operates to generate dual phase pulses or forward driving pulses according to pulses from the pulse generator 53, and simultaneously invert a phase of an output pulse to generate reverse driving pulses according to a count-up signal from the counter 54 and a signal fed through the data bus 52 from the home position return detector 24. Reference numeral 56 designates a latch circuit for outputting a high level signal $\phi_0$ during an exposure operation.

Figure 7:
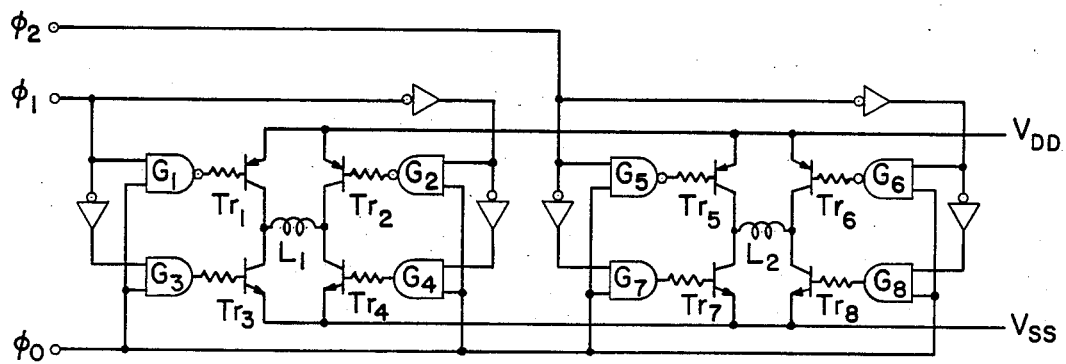
FIG. 7 is a block diagram of the step motor driver of the preferred embodiment.

FIG. 7 shows a preferred embodiment of the aforementioned motor driver 46, in which transistors $Tr_1-Tr_4$ and $Tr_5-Tr_8$ are connected through an alternate switching circuit consisting of gates $G_1-G_4$ and $G_5-G_8$ to the exciting coils $L_1$ and $L_2$ of the step motor, respectively, and the step motor is designed to be driven in the forward and reverse directions according to forward and reverse driving signals composed of $\phi_2$ and $\phi_1$ from the shift register 56.

Figure 8:
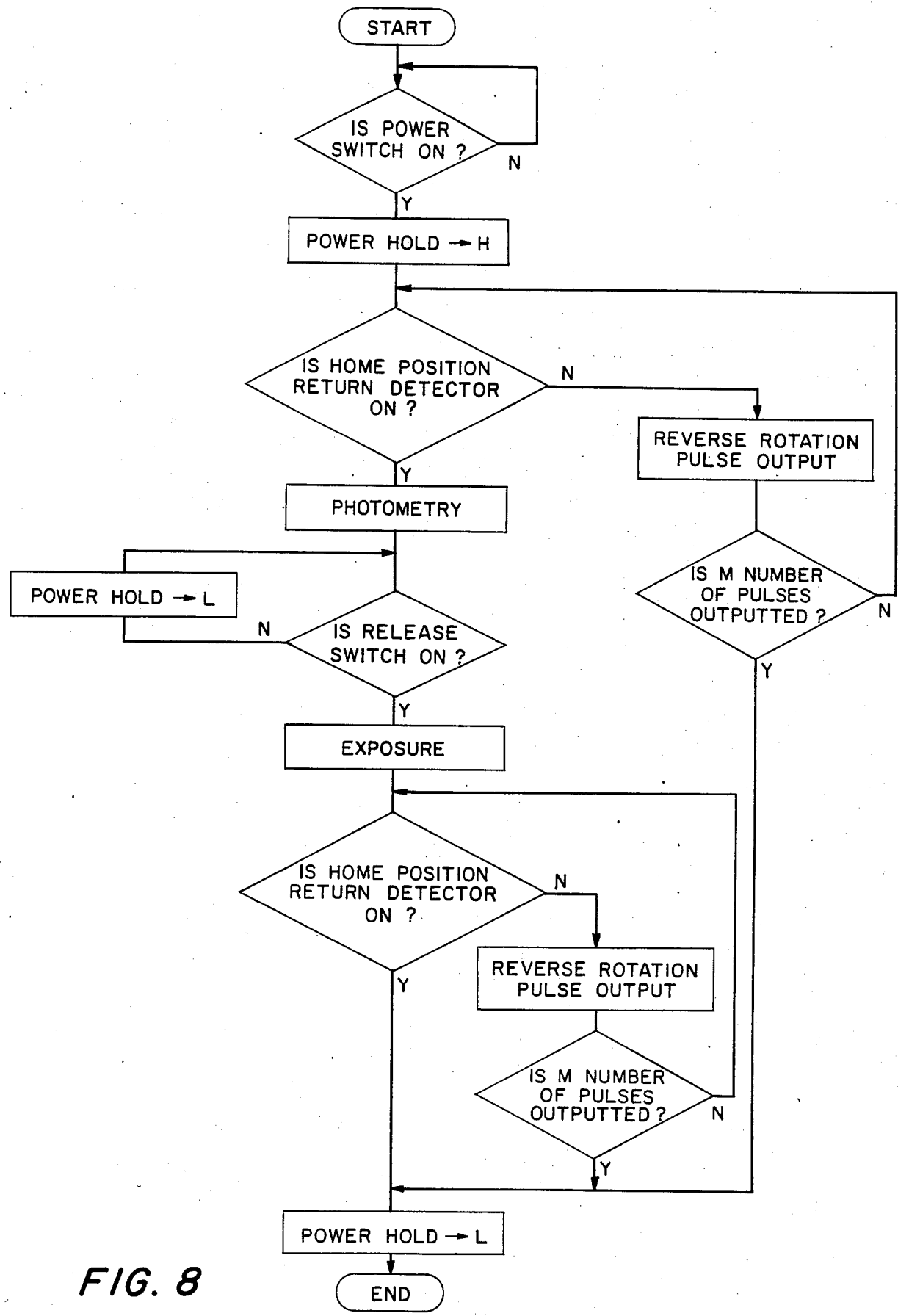
FIG. 8 is a flow chart showing an operation of the device in FIG. 5.

There will be now described operation of the aforementioned device with reference to a flow chart as shown in FIG. 8.

When the release button is pushed to a first position, the power switch 41 interlocked with the release button is turned on, and the operating voltage $V_{DD}$ is supplied from the power supply 42 to the signal processing device 40. Simultaneously, a signal is applied to a reset terminal R after a fixed time is elapsed to release a reset state of the device. Under this condition, the operating voltage $V_{DD}$ is supplied to the device irrespective of ON-OFF of the power switch 41.

At this time before the exposure operation or exposure interval, it is judged whether or not the home position return detector 24 is actuated or not. If the home position return detector 24 is ON, a photometry step is followed. If the home position return detector 24 is OFF, an output phase of the motor driver 55 is inverted to output additional reverse driving pulses to the step motor 2. As a result, the step motor 2 is reversely rotated to forcibly return the sectors 14 to the home position and cause the home position return detector 24 to turn on. To the contrary, if the home position detector 24 yet continues to be OFF irrespective outputting of a fixed number M of reverse rotation or driving pulses, there is a possibility that the shutter mechanism has been troubled, and accordingly such a trouble is indicated. Then, subsequent steps are jumped, and a hold terminal voltage is decreased to a L level to stop the device, so as to avoid undue consumption of a battery.

When the sectors are positioned in the home position in this manner, photometry is carried out by the object luminance measuring circuit 45.

Such an operation as previously mentioned is automatically and continuously carried out by turning on the power switch 41.

Next, the release button is pushed to a second position to select an exposure step.

Figure 9:
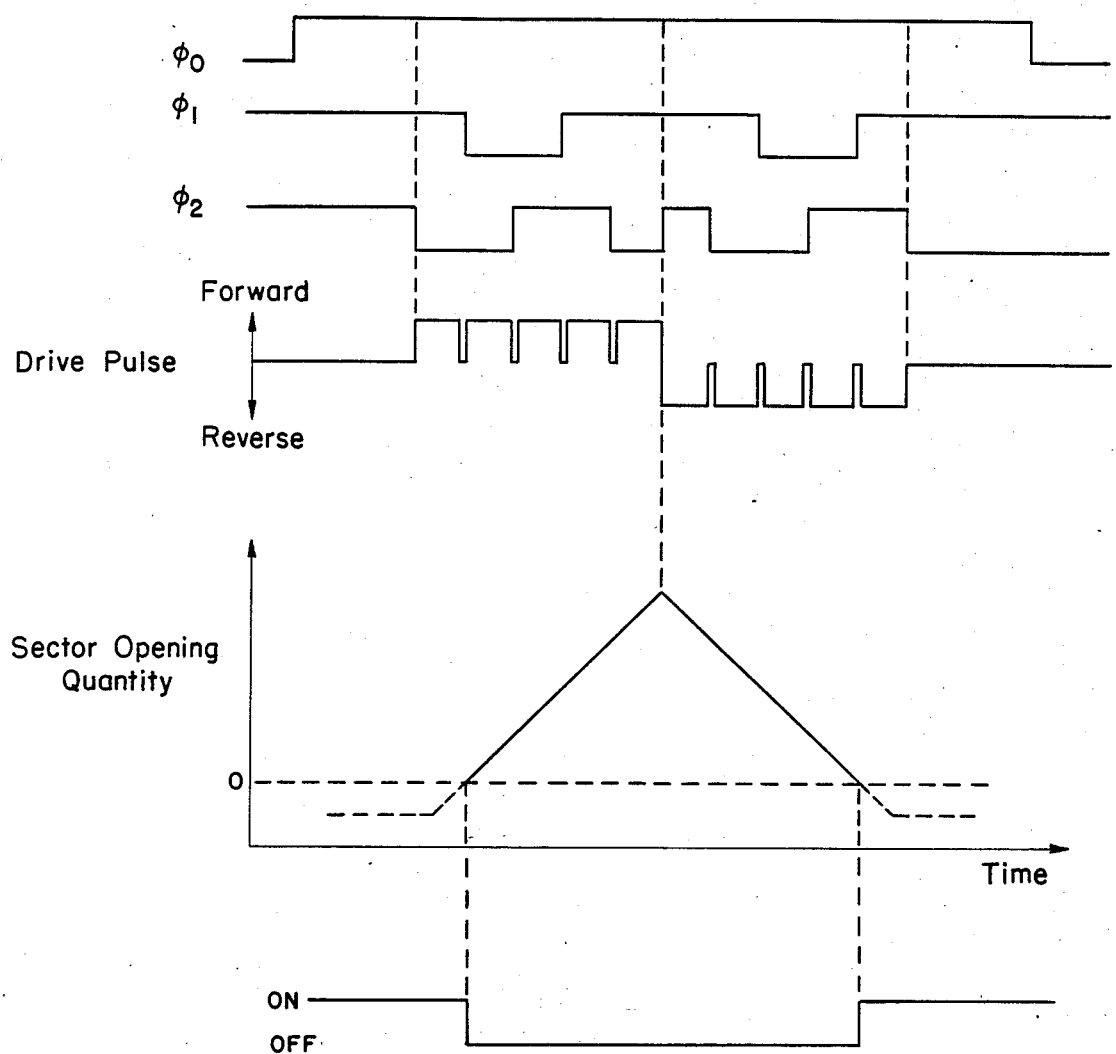
FIG. 9 is a waveform chart showing an operation of the device in FIG. 5.

The exposure quantity as obtained by the previous step is accessed from the address E in the data ROM 51 to preset the step rotation number data $N_s$ corresponding to the exposure quantity in the counter 54. Then, the signal $\phi_0$ fed to the step motor is changed to a high level to excite the step motor. Such an excited condition is maintained for 10 ms so as to conduct processing for a subsequent stabilizing operation of the step motor (FIG. 9).

When the rotor comes to stand ready, pulses are input to the counter 54 to forwardly rotate the step motor one step after another through the motor driver 46 thereby to start opening the sectors 14. As a result, the home position return detector 24 becomes OFF, and the counter 54 is counted down one by one. When the preset number of step drive pulses are input to the counter 54 in this manner, the step rotation number $N_s$ is preset again in the counter 54 from the data ROM 51, and simultaneously a phase of an output pulse from the motor driver 46 is switched. As a result, the pulse motor is reversely rotated to start closing the sectors 14. At the timing when the counter content of the counter 54 becomes zero, outputting of the step drive pulse is stopped. Accordingly, the sectors 14 are returned to the home position to bring the position restricting spring 18 into contact with the conductive piece to close a conductive line. Then, the home position return detector 24 becomes ON, and simultaneously a light path is closed. When the sector is closed, the signal $\phi_0$ to the step motor is fed for a predetermined time, e.g., 10 ms to forcibly stop the motor, thereby preventing re-exposure. At this time after the exposure operation or interval, it is judged whether or not the home position return detector 24 is ON. If the detector 24 is ON, supply of the operating voltage is stopped to make ready for the next photographying. To the contrary, if the detector 24 is still under the OFF condition, it is considered that the sector is not completely closed because of any inconveniences, and therefore reverse rotation pulses are again output from the motor driver 46 to reversely rotate the step motor thereby to close the sector and drive the same to the home position. At this time, it is detected whether or not the home position return detector 24 goes ON. Consequently, it is possible to repair a trouble due to instantaneous contact. Further, if the home position return detector 24 is not turned on irrespective of outputting predetermined number M of reverse rotation pulses, it is considered that there is possibility of the shutter mechanism being troubled, and therefore such a trouble is indicated to call attention for repair, and supply of the operating voltage is stopped after a predetermined time is elasped.

Although return of the sector to the home position is detected by forming a switch consisting of the position restricting spring and the conductive piece in the above-mentioned preferred embodiment, such a switch may be formed of any other members responsive to rotation of the sector such as a sector driving wheel and a sector lever, or the sector itself and the conductive piece. Further, a limit switch operable mechanically, optically and electromagnetically with the aid of these members may be employed so as to attain the same effect.

As ia above described, according to the present invention, the shutter mechanism body is provided with the home position return detector for detecting whether or not the sector 1 adapted to be opened and closed by the forwardly/reversely rotatable step motor is positioned in the home position, and the pulse motor is designed to be reversely rotated when it is detected that the sector 1 is not positioned in the home position during non-exposure or at timings other than the exposure interval. Accordingly, even if the sector is not returned to the home position because of any inconvenience, it is possible to automatically return the sector to prevent erroneous exposure.

What is claimed is:

1. A camera shutter comprising: a shutter mechanism body including a sector defining a lens aperture to be opened and closed, a forwardly/reversely rotatable step motor for driving the sector to open and close the lens aperture, and a control unit having home position return detection means for detecting whether or not said sector is positioned in a home position; object luminance detection means for outputting a signal corresponding to an object luminance; and motor driver means for rotating said step motor in forward and reverse directions in a rotational quantity according to the signal from said object luminance detection means and reversely rotating said step motor when said home position return detection means detects that said sector is not positioned in the home position before and after an exposure operation of the shutter mechanism body.

2. A camera shutter comprising: shutter sector means mounted to undergo displacement from a rest position in opening and closing directions to define an exposure interval; sector drive means including a bidirectional stepping motor rotationally driveable in forward and reverse directions in response to forward and reverse driving pulses for effecting displacement of the shutter sector means from the rest position in the opening and closing directions; brightness measuring means for measuring the brightness of an object to be photographed and producing an output signal corresponding to the measured object brightness; position detecting means operative at timings other than during the exposure interval for detecting whether the shutter sector means is positioned out of the rest position and producing a corresponding control signal; and stepper motor driving means for applying forward and reverse driving pulses to the stepping motor during the exposure interval determined by the output signal from the brightness measuring means and for applying additional reverse driving pulses at timings other than during the exposure interval to the stepping motor in response to the control signal from the position detecting means to effect displacement of the shutter sector means in the closing direction to the rest position.

3. A camera shutter according to claim 2; wherein the stepping motor driving means includes means for applying a predetermined number of the additional reverse driving pulses to the stepping motor.

4. A camera shutter according to claim 3; including means for actuating the position detecting means after application of the predetermined number of additional reverse driving pulses and thereafter cutting off the power supply when the position detecting means detects the shutter sector means is not positioned in the rest position.

5. A camera shutter according to claim 2; including means for automatically actuating the position detecting means immediately prior to the exposure operation of the camera shutter.

6. A camera shutter according to claim 2; including means for automatically actuating the position detecting means immediately after the exposure operation of the camera shutter.

7. A camera shutter according to claim 2; wherein the position detecting means comprises a contact switch actuated by the shutter sector means.

8. A camera shutter according to claim 2; wherein the sector drive means comprises a movable sector driving wheel connected between the stepping motor and the shutter sector means for driving the shutter sector means in response to rotation of the stepping motor, and a pin positioned to engage with the sector driving wheel during movement thereof in one direction to determine the rest position thereof.

9. A camera shutter according to claim 8; wherein the sector drive means includes a conductive spring for urging the sector drive wheel toward the pin; and the position detecting means includes a conductive plate member disposed adjacent to the spring and movable into contact with the same when the shutter sector means is positioned in the rest position.

10. A camera shutter according to claim 2; wherein the brightness measuring means includes means for producing an output signal for determining the number of forward and reverse driving pulses according to the measured object brightness.

11. A camera shutter according to claim 10; wherein the stepping motor driving means includes a counter for counting the forward and reverse driving pulses to produce a specified number of forward and reverse driving pulses according to the output signal from the brightness measuring means.

12. A camera shutter according to claim 2; wherein the stepping motor driving means includes means for producing forward driving pulses composed of two-phase signals.

13. A camera shutter according to claim 12; wherein the stepping motor driving means includes a shift register for inverting the phase of the forward driving pulses to produce reverse driving pulses.

14. A camera shutter according to claim 13; wherein the stepping motor driving means includes means responsive to the control signal from the position detecting means for actuating the shift register.

* * * * *